United States Patent [19]

Nishida

[11] Patent Number: 4,600,041

[45] Date of Patent: Jul. 15, 1986

[54] FUEL TANK WITH FILLING UP INDICATING DEVICE FOR VEHICLE

[75] Inventor: Hiroshi Nishida, Miki, Japan

[73] Assignee: Kawasaki Jukogyo Kabushiki Kaisha, Japan

[21] Appl. No.: 696,595

[22] Filed: Jan. 31, 1985

[30] Foreign Application Priority Data

Feb. 10, 1984 [JP] Japan .............................. 59-17757[U]

[51] Int. Cl.⁴ .............................................. B65B 3/04
[52] U.S. Cl. ...................................... 141/95; 141/326; 73/319
[58] Field of Search ............ 141/94, 95, 96, 192-229, 141/285-310, 325-327, 392; 73/305-322.5

[56] References Cited

U.S. PATENT DOCUMENTS 1,421,615  7/1922  Taylor .................................... 141/95

Primary Examiner—Houston S. Bell, Jr.

[57] ABSTRACT

A fuel tank for motorcycles and other like vehicles. The fuel tank has a filling up indicating device comprising a float which can float on fuel stored in the tank; a stem which is attached to said float, and extends upwards to have an indicator at the top; and a support member which is installed inside a fuel supply port to vertically slide and support said stem.

The configuration provides for simple information that the tank is being topped up when refuelling, thus preventing fuel from overflowing.

4 Claims, 4 Drawing Figures

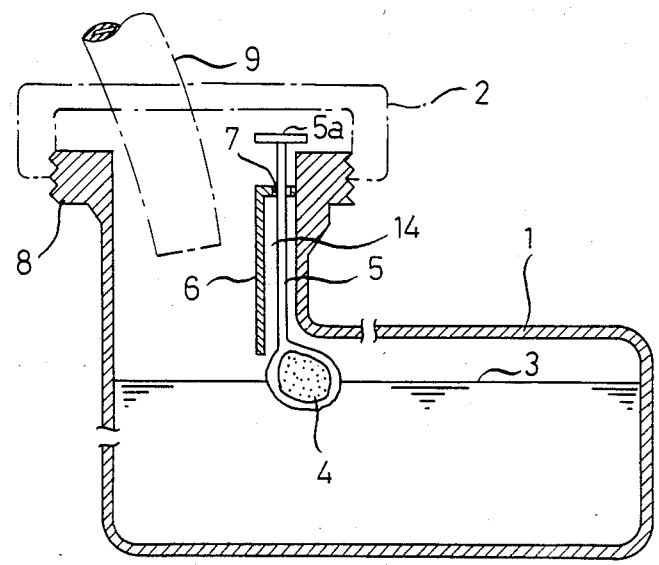
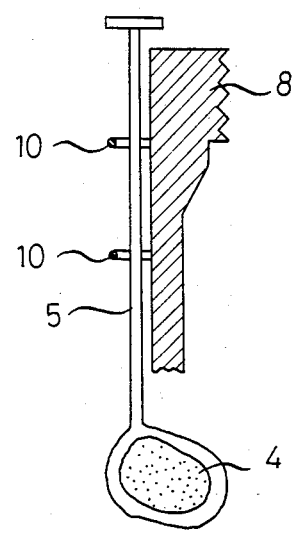
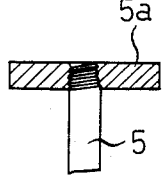
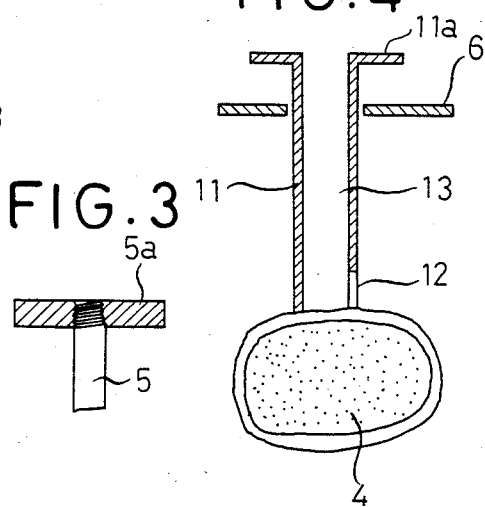

FUEL TANK WITH FILLING UP INDICATING DEVICE FOR VEHICLE

BACKGROUND OF THE INVENTION

This invention relates to a fuel tank with a filling up indicating device, for automobiles, motorcycles and other vehicles, which can easily inform the driver about when the fuel tank is being topped up with gasoline.

In general, automobiles, motorcycles and other vehicles have a fuel gauge or a residual fuel indicating window glass which shows the residual amount of fuel in a fuel tank. The driver makes up fuel, looking at this fuel gauge or filling up indicating window. Common fuel gauges are of an electric resistance type or bimetal type which is equipped with electric transmitter and receiver.

However, when refuelling at a gas station, an electrical source for the fuel gauge is switched off. Therefore, the fuel gauge does not show any indication. Since the driver cannot identify the residual amount of fuel in a tank, he must rely only on his experience or sixth sense,, thus sometimes spilling fuel over the fuel supply port. Particularly with motorcycles, since engines are installed close to the fuel tank, spilt fuel sometimes drops on the engine.

That is why fuel supply nozzles in gas stations are equipped with a filling up detection device which can stop filling just before being top up.

But the filling rate of fuel unit time is too large, to prevent fuel from spilling over, in particular for a small supply port for smaller motorcycles.

Therefore, extreme care must be taken not to spill fuel over in refuelling.

SUMMARY OF THE INVENTION

It can be said that the purpose of this invention is to provide a fuel tank which eliminates said inconvenience of the prior art by a simple mechanism that indicates the tank brimming with fuel.

To achieve aforesaid purpose, a fuel tank according to the invention has a filling up indicating device comprising: A float which can float on fuel stored in the tank: A stem which is attached to the float, and extends upwards to have an indicator at the top: And a support member which is installed inside a fuel supply port to vertically slide and support said stem.

Said configuration allows said stem attached to said float to project out of the fuel supply port on a fuel tank while refuelling, thus the indicator coming up to give the driver simple information that the fuel tank is being topped up.

Therefore, there is no chance of fuel spilling over when refuelling, thus providing for safe service.

Furthermore, this eliminates contamination of the paint coating around a fuel supply port.

In particular with motorcycles, there is no possibility of spilt fuel dropping to a hot engine when refuelling.

BRIEF DESCRIPTION OF THE DRAWING

FIG. 1 is a general section showing a first embodiment according to the invention.

FIG. 2 is a general section showing a part of a fuel filling up indicating device of a second embodiment according to the invention.

FIG. 3 is a sketch exemplifying a method of connecting a top end member to a stem for the embodiments in FIGS. 1 and 2.

FIG. 4 is an enlarged section of main parts showing a third embodiment according to the invention.

DETAILED DESCRIPTION OF THE PREFERRED EMBODIMENT

Referring now in detail to the illustrative embodiments according to the invention:

FIG. 1 is a general section of the first embodiment according to the invention. Numeral 1 is a fuel tank, Numeral 2 is a cap for said fuel tank 1, Numeral 3 is fuel stored in the fuel tank 1, and Numeral 4 is a float floating on the surface of the fuel 3 in the fuel tank 1. A stem 5 extends down to be connected at the bottom to the float 4 as one-piece by welding, or screw, or engagement, and can vertically slide through a hole 7 opened in the top cover plate of a cylindrical support lug 6 attached to the inner surface of a fuel supply port 8 for the fuel tank 1. Onto the top end of the stem 5, as shown in detail in FIG. 3, a disk 5a is screwed, after the stem projects out through the hole 7. A part of the disk 5a protrudes out of the inner diameter of the fuel supply port 8 (over the top surface), therefore being able to stay on a part of the top surface with the stem hung in the support lug, when the fuel in the tank 1 comes down below a certain given level. The disk 5a may be connected to the stem 5 by a variety of known methods other than screw as illustrated in FIG. 3.

The embodiment according to the invention as shown in FIG. 1 operates as follows:

While refuelling with a fuel supply nozzle 9 inserted into the fuel supply port 8, the level of fuel goes up in the fuel tank 1. When the level of fuel 3 goes up to a certain level, the float 4 starts to go up, and then the stem 5 jointed to the float 4 also starts to slide up in the support lug 6 until the stem 5 itself starts to protrude out of the supply port 8, in other words, the disk 5a leaves the top surface of the supply port 8. When the fuel tank 1 has been fully topped up with fuel 3, the disk comes up to a predetermined level. Therefore the position of the disk can easily inform the driver about when the tank is being topped up.

A scale on the stem 5 also can be a simple way of telling the remains in the tank 1 to be filled with fuel.

In refuelling with the nozzle 9, a space 14 enclosed by said support lug 6 can be used as a breather passage.

FIG. 2 is an enlarged section showing only main parts of a fuel filling up indicating device of a second embodiment according to the invention. In FIG. 2, as compared with FIG. 1, like reference characters denote like parts, thus eliminating the need for explanations of the like parts. Numeral 10 is a ring-like support lugs supporting the stem 5 for the float 4. This embodiment uses two lugs 10, but one lug may suffice.

The second embodiment in FIG. 2 is substantially the same in operation as the first embodiment in FIG. 1. So the operation of the second embodiment is not explained here.

FIG. 4 is an enlarged section of the main parts of a fuel filling up indicating device for the third embodiment. In FIG. 4, as compared with FIG. 1, like characters denote like parts, thus eliminating the need for explanations of the like parts. Numeral 11 is a cylindrical hollow stem fixedly secured to the float 4, near which a hole 12 is opened in the stem, and the top end of the cylindrical hollow stem 11 is not capped, but attached with a flange 11a on the outside.

In serving the tank with fuel, with this embodiment too, similarly to said embodiments, the stem 11, that is, the flange 11a goes up to provide for a simple indication of the top up condition as well as the space 13 in the hollow stem 11 serves as a passage for the air entrained in the fuel tank 1 to be breathed out through the opening 12 and the passage 13, thus facilitating fuel supply.

What is claimed is:

1. A fuel tank for vehicles having a fuel supply port, a removable cap for said port, and a filling up indicating device comprising a float which can float on fuel stored in the tank, a stem which is attached to said float and extends upwards, an indicator connected to the top of said stem, and a support member which is installed inside said fuel supply port to support said stem and enable said stem to vertically slide, wherein the improvement resides in that said stem is slidably supported near and along the inner surface of said fuel supply port; and said stem and said indicator are held inside said cap when said supply port is closed by the cap.

2. A fuel tank as claimed in claim 1, wherein said support member is formed as a vertical cylindrical wall attached to the inner surface of said fuel supply port.

3. A fuel tank as claimed in claim 1, wherein said float is connected with said stem in offset relation to the supply port in such a manner that the float is apart from the center line of the supply port.

4. A fuel tank as claimed in claim 1, wherein said stem is formed as a hollow cylinder having openings at bottom and top end portions.

* * * * *